Dec. 30, 1969  R. B. CULVER  3,486,380
DIFFERENTIAL PRESSURE APPARATUS FOR MEASURING FLUID DENSITY
Filed Dec. 21, 1967  3 Sheets-Sheet 1

RICHARD B. CULVER
INVENTOR

BY William E. Johnson, Jr.
ATTORNEY

Dec. 30, 1969    R. B. CULVER    3,486,380
DIFFERENTIAL PRESSURE APPARATUS FOR MEASURING FLUID DENSITY
Filed Dec. 21, 1967    3 Sheets-Sheet 3

RICHARD B. CULVER
INVENTOR

BY William E. Johnson Jr
ATTORNEY 3,486,380
DIFFERENTIAL PRESSURE APPARATUS FOR MEASURING FLUID DENSITY
Richard B. Culver, Houston, Tex., assignor to Dresser Industries Inc., Dallas, Tex., a corporation of Delaware
Filed Dec. 21, 1967, Ser. No. 692,459
Int. Cl. G01l 9/00, 7/18
U.S. Cl. 73—398                                  7 Claims

ABSTRACT OF THE DISCLOSURE

An instrument having a U-shaped manometer mounted therein is adapted for lowering into a well bore. The ends of the manometer are connected to the external fact of the housing through a pair of neoprene diaphragms. A continuous column of fluid is maintained within the manometer, being partially filled with a light oil and partially filled with mercury. A source of low energy radiation is floated on the mercury and a radiation detector is located close to and above the source. A change in the pressure differential existing between the neoprene diaphragms causes a corresponding change in the reading from the detector, thus providing an indication of a change in the density of the fluid within the well bore.

In an alternative embodiment, a pair of radiation sources and radiation detectors provide temperature compensation. In another embodiment, an iron core is floated on the surface of the mercury columns in the two sides of the U-shaped manometer and a differential transformer is placed around each column adjacent its core. The transformer outputs are connected in series opposing relationship so that the output signal is the difference in the individual outputs.

BACKGROUND OF THE INVENTION

This invention relates generally to an apparatus for measuring the density of a fluid, and in particular to an apparatus for measuring the pressure differential between two elevations in a fluid to provide an indication of the density of the fluid.

The primary object of the invention is to provide an improved apparatus for measuring the density of a fluid;

A further object of the invention is to provide an apparatus for measuring the density of a fluid within a well borehole;

Still another object of the invention is to provide a fluid density measuring apparatus having an increased sensitivity; and Still another object of the invention is to provide an apparatus for measuring density of a fluid, the apparatus having an inherent temperature stability.

The objects of the invention are accomplished, generally, by providing an instrument having a manometer coupled to the outside surface of the housing through a pair of diaphragms. The manometer has a continuous liquid column therein, portions of the column being filled with a very light density liquid and other portions of the column being filled with a very heavy density liquid, for example, mercury. Means are also provided for indicating a change in the level of the high density fluid, thus giving an indication that a pressure differential exists between the two diaphragms.

These and other objects, features and advantages of the present invention will be apparent from the following detailed description wherein reference is made to the figures of the accompanying drawings and like numerals indicate like portions of the apparatus:

Figure 1:
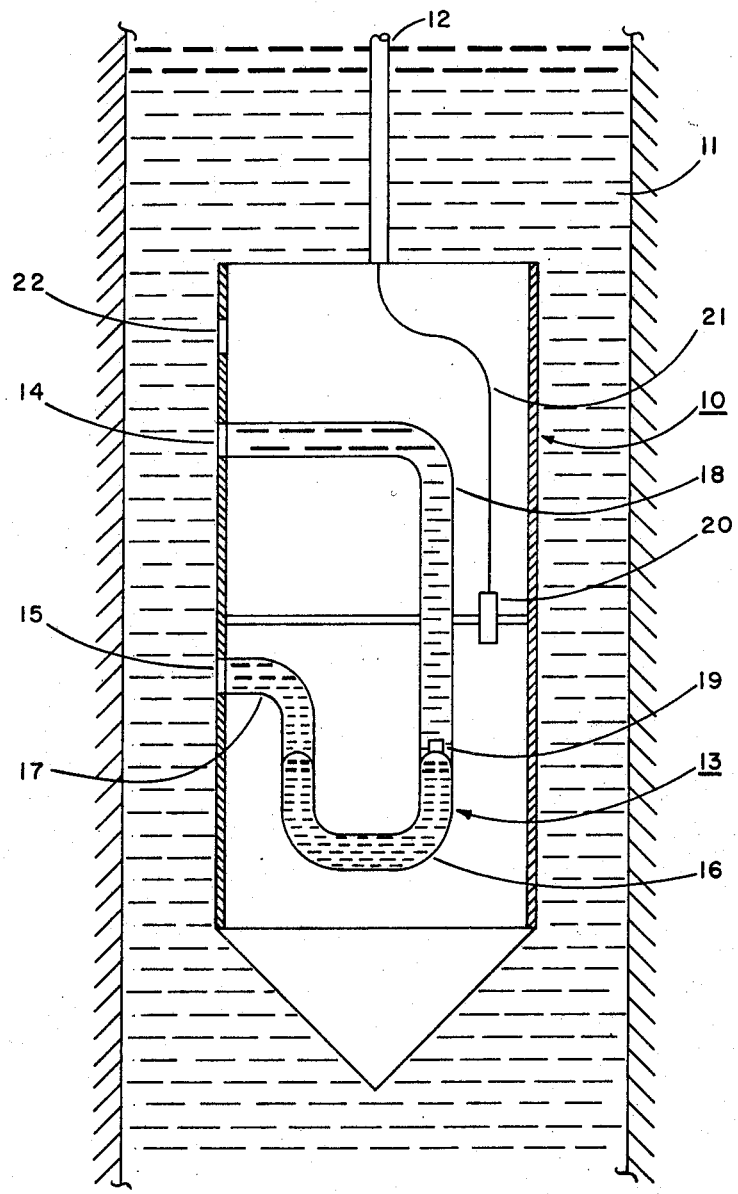
FIGURE 1 is a schematic diagram of the apparatus according to the invention within a fluid medium.

In those forms of the present invention chosen for purposes of illustration in the drawings, FIGURE 1 illustrates an apparatus according to the present invention having a housing 10 adapted for lowering into a fluid medium 11, for example, an earth borehole. The instrument 10 is connected to the earth's surface through a cable 12 which is adapted to raise and to lower the instrument 10 in a manner well known in the well logging art. The cable 12 is also adapted to contain therein one or more electrical conductors for transmitting electrical signals from the instrument 10 to the earth's surface.

A U-shaped manometer 13 is mounted within the housing 10, having diaphragms 14 and 15, for example, of neoprene, so that the liquid within the manometer is subjected to the ambient pressure immediately adjacent each of the diaphragms 14 and 15 within the fluid 11. The bottom portion 16 of the manometer contains a relatively heavy density fluid, for example, mercury, whereas the portions 17 and 18 of the manometer contain a relatively light density fluid, for example, a lightweight oil. It should be apparent to those skilled in the art that the mercury settles to the bottom portion of the manometer and that the lighter-weight oil will be confined to the uppermost parts of the manometer. A source 19 of low energy radiation is floated on the mercury column 16. A radiation detector 20, having an electrical conductor 21 leading to the cable 12, is arranged within the housing 10 such that the level of radiation detection at the detector 20 is a function of the height of the mercury column 16.

When the instrument 10 is held vertically in air, the pressure differential between the points represented by diaphragms 14 and 15 is, for practical purposes, zero. The height of the mercury column within the manometer under ambient air conditions has a unique value, and the detector 20 output has a unique value. When the instrument 10 is lowered into a fluid media, for example, a fluid-filled bore hole, there will be a pressure differential between the diaphragms 14 and 15 which causes the mecury level to change, thus causing the source 19 to move closer to the detector 20 with a concomitant increase in the counting rate within the detector. It should be appreciated that such a change in counting rate is proportional to the pressure differential between the two points represented by the diaphragms 14 and 15. By using fluids of known densities, the instrument can be calibrated in terms of density, or the density can be calculated from the pressure differential after the instrument is calibrated in terms of pressure. This particular embodiment can be temperature sensitive, but such a sensitivity causes no problems when the instrument is used within a temperature regulated fluid medium. Furthermore, such an instrument can also be used within a bore-hole environment merely by monitoring the temperature (not illustrated) of the ambient fluid and correcting the output from the detector 20 for the particular temperature involved.

Also included within the housing 10 is a third neoprene diaphragm 22 which allows the liquid filled inner chamber of the housing 10 to be subjected to the pressure of the fluid outside the instrument 10. Such an arrangement prevents the structure of the manometer from being subjected to pressures which would otherwise perhaps crush its walls. It should be appreciated, however, that the manometer can be constructed of a very strong material, for example, of stainless steel, to withstand the pressures of the ambient fluids and thus eliminate the need for the diaphragm 22 and the liquid within the housing 10 if desired.

Figure 2:
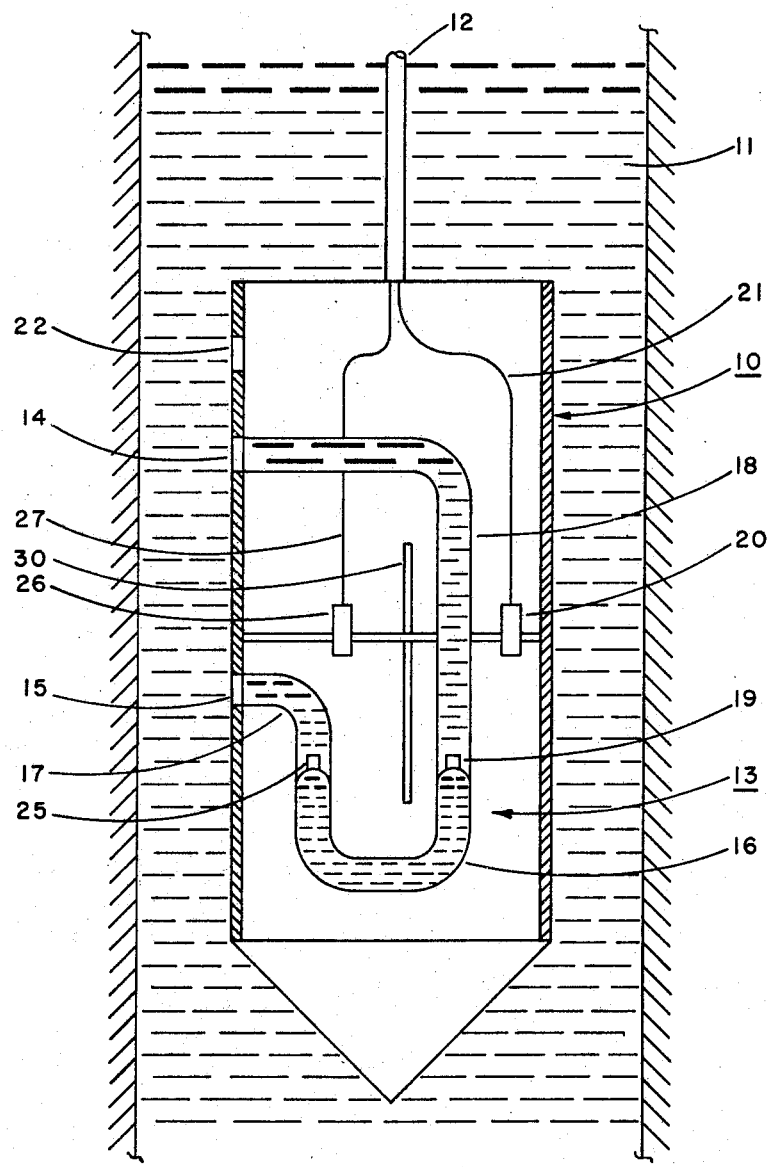
FIGURE 2 is an alternative embodiment of an apparatus according to the invention wherein the apparatus has means for providing temperature compensation.

FIGURE 2 illustrates an alternative embodiment of the apparatus according to the present invention wherein the parts of the apparatus are similar to those of FIGURE 1 except for having a second radioactive source 25 and a second radiation detector 26. Electrical conductor 27 is connected between the detector 26 and the cable 12 to provide a means for conducting electrical signals from the detector 26 to the earth's surface, along with those from the detector 20 along the conductor 21. A shielding member 30, for example, comprised of lead or some other such well-known radiation shield material, prevents interaction between the source-detector combinations.

In the operation of the apparatus according to this embodiment, there is provided a means for temperature compensation. The device operates similarly to that of the device in FIGURE 1, except the two radiation sources 19 and 25 and the two radiation detectors 20 and 26 provide a means of compensating for the changes in the volume of the mercury column due to temperature. At a zero pressure differential, for example, as when the unit 10 is calibrated in an ambient air environment, the mercury levels on each side of the bottom of the U-shaped manometer will have some unique height, and the counting rates of the two detectors will have some value. By adjusting count rate meter sensitivities associated with the two detectors, the outputs from the two detectors are made to give equal deflections on a chart in the surface electronics (not illustrated). When the instrument 10 is lowered into a fluid, for example, as in a well borehole, the difference in pressure between the points as represented by the diaphragms 14 and 15 will cause the source 19 to rise and the source 25 to descend. The output from detector 20 will increase and the output from detector 26 will decrease. The difference in the two recorded readings is proportional to the pressure differential as is seen between the two diaphragms 14 and 15. The instrument within this embodiment can be calibrated in a similar manner as the apparatus in FIGURE 1.

In addition to having twice the sensitivity of the apparatus of FIGURE 1, the apparatus in FIGURE 2 is substantially temperature insensitive, since, as the temperature increases and the mercury expands within the manometer, both sources will rise. Since both sources rise, both detector outputs will increase by substantially about the same amount; hence, the difference in counting rate stays substantially the same and no temperature-induced error is present.

Figure 3:
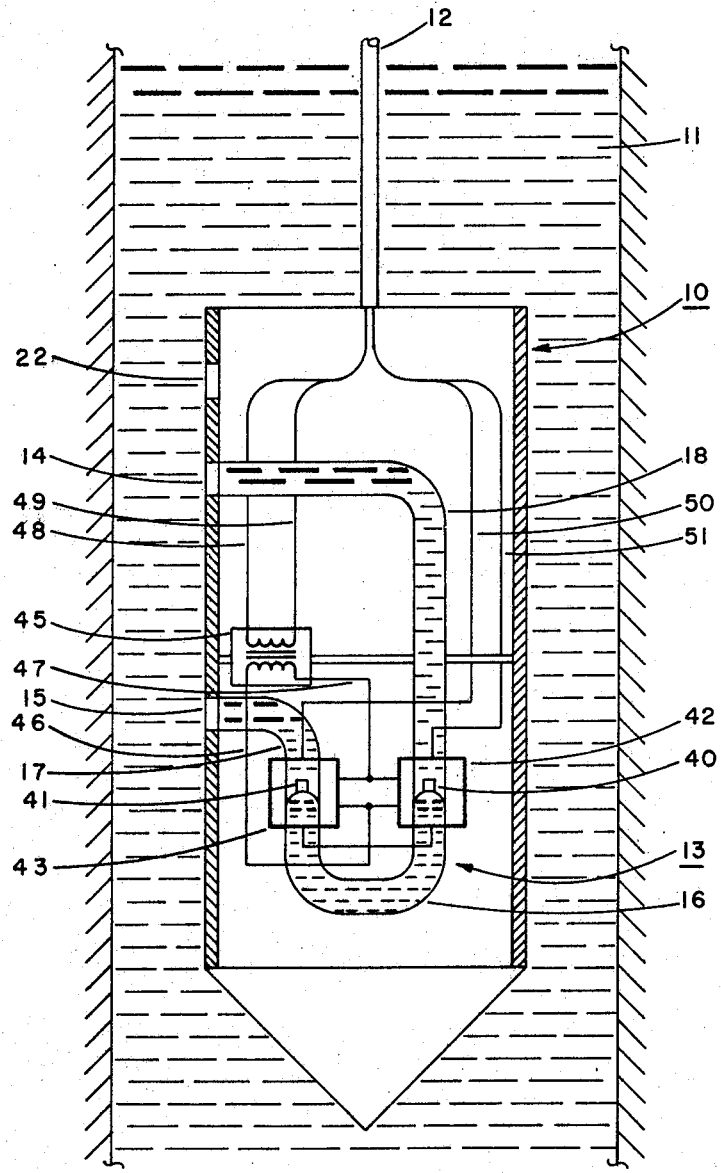
FIGURE 3 is an alternative embodiment of the apparatus according to FIGURE 2 having different detector means.

FIGURE 3 illusrates an alternative embodiment of the apparatus according to the present invention, wherein a magnetic core 40 and 41, for example, iron, is floated on the surface of each mercury column, respectively, and a differential transformer 42 and 43 is placed around each column, adjacent its core, respectively. The outputs of transformers 42 and 43 are connected in series opposing relationship so that the output signal is the difference in the individual outputs. The changes in mercury levels with pressure and temperature will be substantially the same as those described in relation to FIGURE 2, described herein, the system according to FIGURE 3 also being substantially temperature insensitive.

The input power to the transformers 42 and 43 is supplied from the secondary winding of transformer 45 by way of lines 46 and 47. The primary winding of the transformer 45 is connected through lines 48 and 49 to the cable 12 which connects to a suitable power supply in the surface electronics (not illustrated).

The output from the differential transformers 42 and 43 is coupled through conductors 50 and 51 in the cable 12 to conventional monitoring and recording equipment, the output being indicative of the pressure differential being measured.

Thus it should be appreciated that there has been described herein the preferred embodiments for an apparatus for measuring the differential pressure between two points in a fluid medium, two of the embodiments being provided with means for producing a substantially temperature insensitive indication of a pressure differential. While particular embodiments of the present invention have been shown and described, it is apparent that changes and modifications may be made without departing from this invention in its broader aspects, for example, as by the utilization of a dense fluid other than mercury. Likewise, although the detector means have been illustrated as being either a radiation detector or as an iron core-transformer arrangement, other means for providing an indication of the change of the mercury level will become apparent to those skilled in the art from a reading of the disclosure herein. Likewise, although the iron core and the radiation source embodiments indicate that each should float upon the mercury column, those skilled in the art will recognize that the dense liquid, be it mercury or some other such liquid, could be saturated with the detectable material rather than having it float. Therefore, the aim in the appended claims is to cover all such changes and modifications as falls within the spirit and scope of this invention.

The embodiments of the invention in which an exclusive property or privilege is claimed are defined as follows:

1. An apparatus for measuring the pressure differential between a first and a second point in a fluid medium comprising:
   (a) an instrument housing adapted to be positioned in said fluid medium;
   (b) a liquid-filled tubular member in said housing having a first end exposed to the pressure of the fluid medium at said first point through a first diaphragm and having a second end exposed to the pressure of the fluid medium at said second point through a second diaphragm, said tubular member being partially filled with a relatively heavy density liquid and partially filled with a relatively light density liquid; and
   (c) detector means for determining changes in level of said heavy density liquid due to a pressure differential between said first and second points in said fluid medium.

2. The apparatus according to claim 1 wherein said detector means comprises a radiation source floating on said heavy density liquid and a radiation detector in proximity to said source, whereby a change in the level of said heavy density liquid causes a change in the output of said radiation detector.

3. The apparatus according to claim 1 wherein said tubular member comprises a U-shaped bottom portion having said heavy density liquid in both sides of said bottom portion.

4. The apparatus according to claim 3 wherein said detector means comprises a first radiation source floating on the heavy density liquid in one side of said bottom portion and a second radiation source floating on the heavy density liquid in the other side of said bottom portion, a first radiation detector responsive to said first source and a second radiation detector responsive to said second source, whereby the changes in level in the heavy density liquid causes changes in the outputs of said first and second radiation detectors.

5. The apparatus according to claim 3 wherein said detector means comprises a first magnetic core material floating on the heavy density liquid in one side of said bottom portion and a second magnetic core material floating on the heavy density liquid in the other side of said bottom portion, a first differential transformer responsive to said first core material and a second differential transformer responsive to said second core material, whereby the changes in level in the heavy density liquid causes changes in the outputs of said first and second transformers.

6. The apparatus according to claim 5 wherein said core material comprises iron.

7. The apparatus according to claim 6 wherein said heavy density liquid comprises mercury.

References Cited

UNITED STATES PATENTS 3,323,368   6/1967   Glassey.

RALPH G. NILSON, Primary Examiner

A. B. CROFT, Assistant Examiner

U.S. Cl. X.R.

73—401; 250—43.5